(12) United States Patent
Leroudier et al.

(10) Patent No.: US 10,009,790 B2
(45) Date of Patent: Jun. 26, 2018

(54) WIDE AREA TRANSPORT NETWORKS FOR MOBILE RADIO ACCESS NETWORKS AND METHODS OF USE

(71) Applicant: E-Blink NV, Antwerp (BE)

(72) Inventors: Frederic Leroudier, Pleasanton, CA (US); Alain Rolland, Quincy Sous Senart (FR); Christian Bittar, Verriere le Buisson (FR); Jawad El Sayed-Ahmad, Courbevoie (FR); Jean-Christophe Plumecoq, Palaiseau (FR); Laurent Bellot, Versailles (FR); Stéphane Blanc, Breuillet (FR); Tariq Boukour, Beuvry la Foret (FR)

(73) Assignee: EBlink NV, Antwerp (BE)

( * ) Notice: Subject to any disclaimer, the term of this patent is extended or adjusted under 35 U.S.C. 154(b) by 483 days.

(21) Appl. No.: 14/311,186

(22) Filed: Jun. 20, 2014

(65) Prior Publication Data

US 2014/0334305 A1    Nov. 13, 2014

Related U.S. Application Data

(63) Continuation of application No. 13/732,273, filed on Dec. 31, 2012, now Pat. No. 8,761,141.

(30) Foreign Application Priority Data

May 4, 2012  (FR) ..................................... 12 54139

(51) Int. Cl.
*H04W 4/00* (2018.01)
*H04W 28/02* (2009.01)
(Continued)

(52) U.S. Cl.
CPC ....... *H04W 28/0247* (2013.01); *H04L 5/0001* (2013.01); *H04L 25/02* (2013.01);
(Continued)

(58) Field of Classification Search
None
See application file for complete search history.

(56) References Cited

U.S. PATENT DOCUMENTS

| 4,806,878 A | 2/1989 | Cowley |
| 4,827,395 A | 5/1989 | Anders et al. |

(Continued)

FOREIGN PATENT DOCUMENTS

| AU | 2007270980 | 1/2008 |
| AU | 2004311246 | 7/2009 |

(Continued)

OTHER PUBLICATIONS

U.S. Appl. No. 13/735,903, filed Jan. 7, 2013, Non-Final Office Action dated Aug. 18, 2014.

(Continued)

*Primary Examiner* — Ayaz Sheikh
*Assistant Examiner* — Sori Aga
(74) *Attorney, Agent, or Firm* — Carr & Ferrell LLP

(57) ABSTRACT

Wide area transport networks for mobile Radio Access Networks, and methods of use are provided herein. An exemplary wide area transport network may include a plurality of network segments that include at least one wireline network and at least one wireless network communicatively coupled with one another. Each of the plurality of network segments may be configured to transmit at least one of a plurality of signals communicated between a baseband module and a wireless transceiver.

10 Claims, 12 Drawing Sheets

(51) Int. Cl.
  *H04W 24/00* (2009.01)
  *H04W 72/04* (2009.01)
  *H04L 25/02* (2006.01)
  *H04W 88/08* (2009.01)
  *H04L 5/00* (2006.01)
  *H04L 12/28* (2006.01)
  *H04M 1/00* (2006.01)

(52) U.S. Cl.
  CPC ....... *H04W 24/00* (2013.01); *H04W 72/0453* (2013.01); *H04W 88/085* (2013.01)

(56) References Cited

U.S. PATENT DOCUMENTS

| | | |
|---|---|---|
| 5,513,176 A | 4/1996 | Dean et al. |
| 5,533,011 A | 7/1996 | Dean et al. |
| 5,602,834 A | 2/1997 | Dean et al. |
| 5,652,765 A | 7/1997 | Adachi et al. |
| 5,768,268 A | 6/1998 | Kline et al. |
| 5,842,002 A | 11/1998 | Schnurer et al. |
| 5,867,763 A | 2/1999 | Dean et al. |
| 5,940,598 A | 8/1999 | Strauss et al. |
| 5,969,678 A | 10/1999 | Stewart |
| 6,049,315 A | 4/2000 | Meyer |
| 6,072,994 A | 6/2000 | Phillips et al. |
| 6,094,677 A | 7/2000 | Capek et al. |
| 6,122,529 A | 9/2000 | Sabat, Jr. et al. |
| 6,223,021 B1 | 4/2001 | Silvia et al. |
| 6,339,611 B1 | 1/2002 | Antonio et al. |
| 6,349,214 B1 | 2/2002 | Braun |
| 6,385,435 B1 | 5/2002 | Lee |
| 6,389,059 B1 | 5/2002 | Smith et al. |
| 6,603,956 B1 | 8/2003 | Shin |
| 6,640,110 B1 | 10/2003 | Shapira et al. |
| 6,904,266 B1 | 6/2005 | Jin et al. |
| 7,010,325 B1 | 3/2006 | Oh |
| 7,068,973 B1 | 6/2006 | Lovinggood et al. |
| 7,123,911 B1 | 10/2006 | Ngan |
| 7,463,673 B2 | 12/2008 | Fujii et al. |
| 7,535,972 B2 | 5/2009 | Hammerschmidt et al. |
| 7,680,203 B2 | 3/2010 | Kuroda |
| 7,738,579 B2 | 6/2010 | Sadowsky et al. |
| 7,801,230 B2 | 9/2010 | Sung et al. |
| 8,064,821 B2 | 11/2011 | Roland et al. |
| 8,275,310 B2 | 9/2012 | Rolland et al. |
| 8,467,488 B2 | 6/2013 | Rolland et al. |
| 8,532,579 B2 | 9/2013 | Tanigawa et al. |
| 8,761,141 B2 | 6/2014 | Leroudier |
| 8,811,558 B2 | 8/2014 | Rolland et al. |
| 9,020,070 B2 | 4/2015 | Bellot et al. |
| 9,083,440 B2 | 7/2015 | Bellot et al. |
| 9,320,040 B2 | 4/2016 | Bellot et al. |
| 2001/0011009 A1 | 8/2001 | Harada et al. |
| 2001/0031624 A1 | 10/2001 | Schmutz |
| 2002/0028655 A1 | 3/2002 | Rosener et al. |
| 2002/0072375 A1 | 6/2002 | Huslig |
| 2002/0140654 A1 | 10/2002 | Kim et al. |
| 2002/0147978 A1 | 10/2002 | Dolgonos et al. |
| 2003/0016701 A1 | 1/2003 | Hinson |
| 2003/0022650 A1 | 1/2003 | Tsuji et al. |
| 2003/0027597 A1 | 2/2003 | LaGrotta et al. |
| 2003/0140256 A1 | 7/2003 | Hauenstein et al. |
| 2003/0232595 A1 | 12/2003 | Baker et al. |
| 2004/0015712 A1 | 1/2004 | Szor |
| 2004/0048596 A1 | 3/2004 | Wyrzykowska et al. |
| 2004/0052226 A1 | 3/2004 | Frank et al. |
| 2004/0077345 A1 | 4/2004 | Turner et al. |
| 2004/0145849 A1 | 7/2004 | Chang et al. |
| 2004/0150569 A1 | 8/2004 | Proctor, Jr. et al. |
| 2004/0157551 A1 | 8/2004 | Gainey et al. |
| 2004/0166802 A1 | 8/2004 | McKay, Sr. et al. |
| 2005/0085267 A1 | 4/2005 | Lemson et al. |
| 2005/0101349 A1 | 5/2005 | Pihlajamaa et al. |
| 2005/0130587 A1 | 6/2005 | Suda et al. |
| 2005/0176368 A1 | 8/2005 | Young et al. |
| 2005/0256963 A1 | 11/2005 | Proctor, Jr. et al. |
| 2006/0068848 A1 | 3/2006 | Shapira et al. |
| 2006/0105705 A1 | 5/2006 | Maca et al. |
| 2006/0140161 A1 | 6/2006 | Stephens et al. |
| 2006/0205343 A1 | 9/2006 | Runyon et al. |
| 2007/0053409 A1 | 3/2007 | Reunamaki et al. |
| 2007/0091896 A1* | 4/2007 | Liu ........................ H04J 3/1617 370/395.5 |
| 2007/0147278 A1 | 6/2007 | Millar |
| 2007/0171866 A1 | 7/2007 | Merz et al. |
| 2007/0243824 A1 | 10/2007 | Roland et al. |
| 2008/0181171 A1* | 7/2008 | Koziy ................. H04W 88/085 370/328 |
| 2009/0003831 A1 | 1/2009 | Zheng |
| 2009/0252267 A1 | 10/2009 | Rolland et al. |
| 2009/0325479 A1 | 12/2009 | Chakrabarti et al. |
| 2010/0056162 A1 | 3/2010 | Rolland et al. |
| 2010/0142598 A1 | 6/2010 | Murray et al. |
| 2010/0165974 A1 | 7/2010 | Nibe |
| 2012/0100847 A1 | 4/2012 | Rahman |
| 2012/0140654 A1 | 6/2012 | Pak et al. |
| 2013/0101299 A1 | 4/2013 | Bellot et al. |
| 2013/0243142 A1 | 9/2013 | Rolland et al. |
| 2013/0294253 A1 | 11/2013 | Leroudier |
| 2013/0294541 A1 | 11/2013 | Blanc et al. |
| 2014/0328274 A1 | 11/2014 | Blanc et al. |
| 2015/0245354 A1 | 8/2015 | Bellot et al. |

FOREIGN PATENT DOCUMENTS

| | | |
|---|---|---|
| BR | PI0416338 | 2/2007 |
| BR | PI0713863 | 11/2012 |
| CA | 2655719 | 1/2008 |
| CA | 2790815 | 9/2011 |
| CA | 2546179 | 9/2013 |
| CN | 1256034 | 6/2000 |
| CN | 1325227 | 12/2001 |
| CN | 1792045 | 6/2006 |
| CN | 102918923 | 2/2013 |
| CN | 1883216 | 5/2013 |
| CN | 101647211 | 5/2013 |
| CN | 101485110 | 11/2013 |
| CN | 104272138 | 1/2015 |
| CN | 104272858 | 1/2015 |
| DE | 3108901 A1 | 9/1982 |
| DK | 160429 | 12/2009 |
| EA | 010460 | 8/2008 |
| EA | 201201190 | 4/2013 |
| EP | 1501215 A1 | 1/2005 |
| EP | 1534027 | 5/2005 |
| EP | 1564911 | 8/2005 |
| EP | 1648099 A1 | 4/2006 |
| EP | 1827035 A1 | 8/2007 |
| EP | 1876728 | 1/2008 |
| EP | 1895681 | 3/2008 |
| EP | 160429 | 8/2009 |
| EP | 2099183 | 9/2009 |
| EP | 2540136 | 1/2013 |
| EP | 2859377 A1 | 4/2015 |
| ES | 2332368 | 2/2010 |
| FR | 2747867 | 10/1997 |
| FR | 2862451 | 3/2006 |
| FR | 2956934 | 9/2012 |
| FR | 2990315 | 6/2014 |
| IL | 175549 | 12/2010 |
| JP | 59154827 B | 9/1984 |
| JP | H06-165240 | 6/1994 |
| JP | H06-35520 | 12/1994 |
| JP | H09-289676 | 11/1997 |
| JP | 10-200473 | 7/1998 |
| JP | H11-41158 | 2/1999 |
| JP | 2000504898 | 4/2000 |
| JP | 2001-16153 | 1/2001 |
| JP | 2003-521142 | 7/2003 |
| JP | 2004-527926 | 9/2004 |
| JP | 2007295569 A | 11/2007 |
| JP | 2010200241 A | 9/2010 |
| JP | 2013-520902 | 6/2013 |
| JP | 5335193 | 8/2013 |

(56) References Cited

FOREIGN PATENT DOCUMENTS

| | | |
|---|---|---|
| JP | 5439648 | 12/2013 |
| KR | 10/2013/0049175 | 5/2013 |
| KR | 10-1119574 | 8/2013 |
| KR | 101391286 | 5/2014 |
| KR | 20150007336 A | 1/2015 |
| KR | 10/215/0023349 | 3/2015 |
| OA | 13286 | 1/2007 |
| PT | 1690429 | 8/2009 |
| RS | S51094 | 10/2010 |
| UA | 92456 | 11/2010 |
| WO | WO1992010890 | 6/1992 |
| WO | WO1997029608 | 8/1997 |
| WO | WO1999048309 | 9/1999 |
| WO | WO2000072471 | 11/2000 |
| WO | WO2003055246 | 7/2003 |
| WO | WO2004/027635 | 4/2004 |
| WO | WO2004/045125 | 5/2004 |
| WO | WO2004079946 | 9/2004 |
| WO | WO2005051017 | 11/2004 |
| WO | WO2005/05107 | 1/2005 |
| WO | WO2008003911 | 1/2008 |
| WO | WO2008029055 | 3/2008 |
| WO | WO2008067584 | 6/2008 |
| WO | WO2011104481 | 9/2011 |
| WO | WO2013/164445 | 11/2013 |
| WO | WO2013166331 | 11/2013 |

OTHER PUBLICATIONS

International Search Report dated Aug. 9, 2013 6186PCT Application No. PCT/EP2013/059236.
International Search Report dated Jul. 12, 2013 6185PCT Application No. PCT/US2013/039338.
U.S. Appl. No. 14/705,964, filed May 6, 2015, Notice of Allowance, dated Dec. 18, 2015.
U.S. Appl. No. 14/705,964, filed May 6, 2015, Supplemental Notice of Allowability, dated Feb. 16, 2016.
Office Action dated Nov. 2, 2015 in China Application No. 201380023590.3.
U.S. Appl. No. 14/705,964, filed May 6, 2015, Non Final Office Action, dated Jun. 26, 2015.
International Search Report dated Jan. 15, 2008 Application No. PCT/FR2007/051602.
European Search Opinion dated Nov. 13, 2006 in European Application No. 06291127.6.
Objection dated Apr. 2, 2012 in Israeli Application No. 196138.
Notice before Acceptance of Patent Application dated Oct. 22, 2014 in Israeli Application No. 196138.
Search Report dated May 20, 2005 from FR Application No. 0313391.
International Search Report dated Jan. 15, 2008 Application No. PCT/FR2004/002932.
Communication dated Oct. 13, 2006 in European Application No. 04805469.6.
Communication dated Aug. 21, 2007 in European Application No. 04805469.6.
Intention to grant dated Feb. 13, 2009 in European Application No. 04805469.6.
European Search Opinion dated Apr. 13, 2007 in European Application No. 06291394.2.
Communication dated Jun. 10, 2013 in European Application No. 06291394.2.
International Search Report dated Jun. 20, 2008 Application No. PCT/FR2007/051867.
Preliminary Search Report dated Nov. 2, 2010 in French Application No. 1051418.
International Search Report dated Jun. 10, 2011 in Application No. PCT/FR2011/050380.
U.S. Appl. No. 13/580,687, filed Jan. 15, 2013, Notice of Allowance, dated Mar. 2, 2015.
U.S. Appl. No. 14/318,446, filed Jun. 27, 2014, Non Final Office Action, dated Aug. 10, 2016.
U.S. Appl. No. 13/732,273, filed Dec. 31, 2012, Non-Final Office Action, dated Jun. 3, 2013.
U.S. Appl. No. 13/732,273, filed Dec. 31, 2012, Notice of Allowance, dated Jan. 17, 2014.
U.S. Appl. No. 13/735,903, filed Jan. 7, 2013, Non-Final Office Action, dated May 3, 2013.
U.S. Appl. No. 13/735,903, filed Jan. 7, 2013, Final Office Action, dated Aug. 20, 2013.
U.S. Appl. No. 13/735,903, filed Jan. 7, 2013, Non-Final Office Action, dated Feb. 20, 2014.
U.S. Appl. No. 12/306,306, filed Jul. 5, 2007, Non-Final Office Action, dated Feb. 16, 2011.
U.S. Appl. No. 12/306,306, filed Jul. 5, 2007, Final Office Action, dated Nov. 2, 2011.
U.S. Appl. No. 12/306,306, filed Jul. 5, 2007, Non-Final Office Action, dated Jun. 29, 2012.
U.S. Appl. No. 12/306,306, filed Jul. 5, 2007, Notice of Allowance, dated Jan. 30, 2013.
U.S. Appl. No. 10/579,474, filed Mar. 7, 2007, Non-Final Office Action, dated Nov. 6, 2009.
U.S. Appl. No. 10/579,474, filed Mar. 7, 2007, Final Office Action, dated May 17, 2010.
U.S. Appl. No. 10/579,474, filed Mar. 7, 2007, Non-Final Office Action, dated Oct. 27, 2010.
U.S. Appl. No. 10/579,474, filed Mar. 7, 2007, Notice of Allowance, dated Jul. 20, 2011.
U.S. Appl. No. 12/439,837, filed Oct. 6, 2009, Non-Final Office Action, dated Aug. 4, 2011.
U.S. Appl. No. 12/439,837, filed Oct. 6, 2009, Notice of Allowance, dated Jun. 5, 2012.
U.S. Appl. No. 13/874,296, filed Apr. 30, 2013, Non-Final Office Action, dated Sep. 17, 2013.
U.S. Appl. No. 13/874,296, filed Apr. 30, 2013, Notice of Allowance, dated Apr. 10, 2014.

\* cited by examiner

WIDE AREA TRANSPORT NETWORKS FOR MOBILE RADIO ACCESS NETWORKS AND METHODS OF USE

CROSS-REFERENCE TO RELATED APPLICATIONS

This non-provisional U.S. patent application is a continuation of, and claims the priority benefit of U.S. patent application Ser. No. 13/732,273, filed Dec. 31, 2012, entitled "Wide Area Transport Networks for Mobile Radio Access Networks and Methods of Use," now U.S. Pat. No. 8,761,141, issued on Jun. 24, 2014, which claims foreign priority benefit of French Patent Application Number 1254139, filed on May 4, 2012, now French Patent Number 2990315, issued on Nov. 8, 2013, all of which are hereby incorporated by reference herein in their entireties including all references cited therein.

FIELD OF THE INVENTION

The present technology may be generally described as providing wide area transport networks for mobile Radio Access Networks, and more specifically, but not by limitation, to hybrid wired and wireless networks that efficiently transmit fronthaul data flow between (a) baseband processing resource(s) and (a) wireless transceiver(s).

BACKGROUND

Mobile Radio Access Networks (RANs) increasingly rely on high capacity wide area transport networks to interconnect mobile transceivers and baseband processing resources. Transmitting data across a wired network, such as a fiber network allows for high capacity and high speed data transmission. Unfortunately, wired networks may be limited in geographical reach and often require high costs to build and operate. Wireless networks allow for data transmission into locales where wired networks are unavailable. Wireless networks are bandwidth limited and thus do not currently provide the data transmission capacity and velocity afforded by wired networks. An elegant solution to increasing the data transmission capacity and velocity between wireless network transceivers is provided in French Patent Application Number 1254139, filed on May 4, 2012, now French Patent Number 2990315, issued on Nov. 8, 2013, which describes the separation of traffic data between fronthaul signals, control protocol data and user data flow.

What is needed are wide area transport networks that comprise both wired and wireless network segments. Further, these wide area transport networks should allow for selective transmission of fronthaul data flow in either multiplexed or demultiplexed forms depending on performance aspects (e.g., key performance indicators) of network segments of the mobile wireless network.

SUMMARY OF THE PRESENT TECHNOLOGY

According to some embodiments, the present technology may be directed to a wide area transport network, comprising a plurality of network segments that comprise at least one wireline network and at least one wireless network communicatively coupled with one another, each of the plurality of network segments being configured to transmit at least one of a plurality of signals communicated between at least one baseband module and at least one mobile wireless transceiver, plurality of signals corresponding to a digital fronthaul data flow.

According to some embodiments, the present technology may be directed to a method that includes a step of transmitting fronthaul data flow across a wide area transport network that communicatively couples at least one baseband module and at least one wireless transceiver, the wide area transport network comprising a plurality of network segments that comprise at least one wireline network and at least one wireless network communicatively coupled with one another, the fronthaul data flow being demultiplexed and remultiplexed by fronthaul modules of the wireless network. In certain embodiments, key performance indicators of the mobile wireless network may be used in the configuration of this network.

According to some embodiments, the present technology may be directed to methods that comprise: (a) evaluating key performance indicators for a plurality of network segments of a mobile radio access network, plurality of network segments comprising at least one wireline network and at least one wireless network communicatively coupled with one another; and (b) based upon the evaluation of key performance indicators, performing any of multiplexing, demultiplexing, or passing of fronthaul data flow across the plurality of network segments.

According to some embodiments, the present technology may be directed to a wide area transport network, comprising a plurality of network segments that comprise at least one wired network and at least one wireless network communicatively coupled with one another, each of the plurality of network segments being configured to transmit a fronthaul data flow that comprises (an) RF signal(s), for instance coded as in-phase and quadrature radio access signal, control protocol information, and user data flow.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
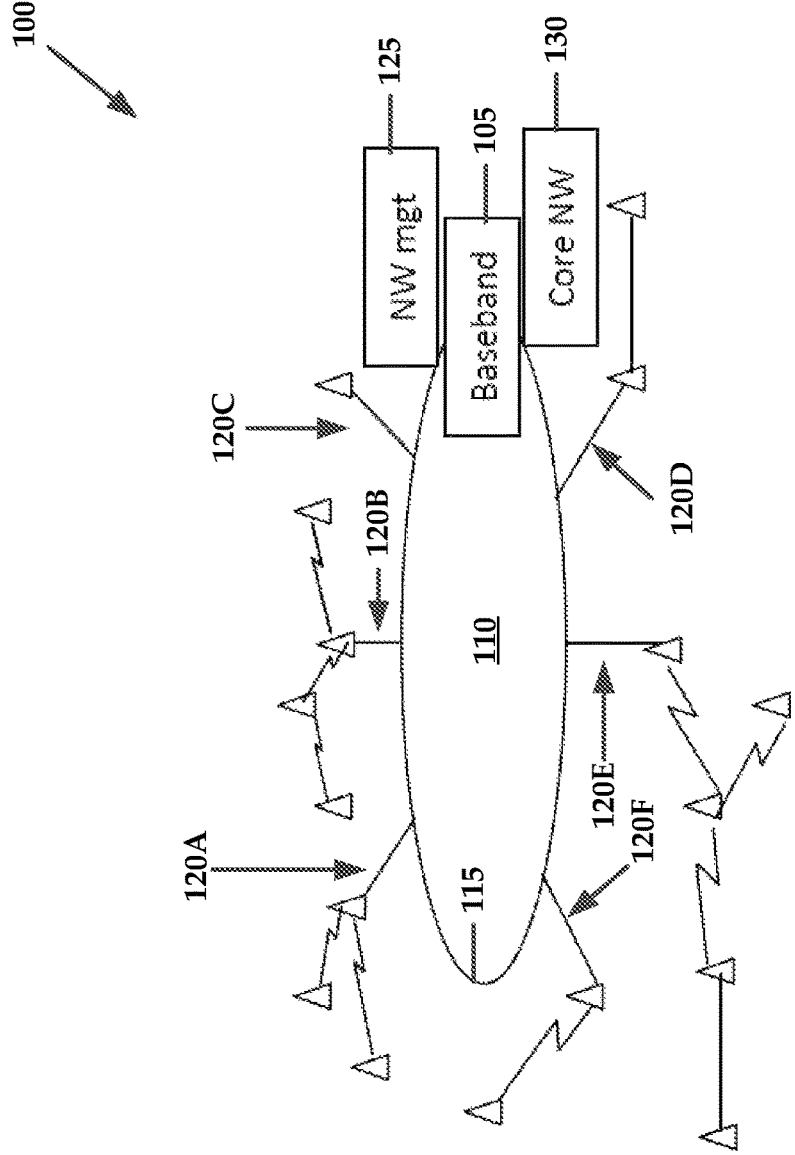
FIG. 1 is a block diagram of an exemplary wide area transport network in which embodiments of the present technology may be practiced.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be directed to wide area transport networks, also referred to as hybrid cloud radio access network transport architectures. Broadly, hybrid networks of the present technology may be built upon a variety of network topologies that allow for the transmission of mobile network fronthaul signals, control management protocol elements, and user digital data flow. The hybrid network may include combinations of fiber optic networks, electric cable networks, along with other types of wired networks that would be known to one of ordinary skill in the art with the present disclosure before them. These wired networks may be communicatively coupled with one or more wireless networks that extend the reach of the wired networks. That is, wired networks are inherently limited in geographical scope. Physical linkages required in a wired network prevent connecting of locations that are inaccessible or impractical for wired media. For example, a centralized metropolitan city may easily access a wired fiber ring, whereas it may be impractical to extend a fiber spoke from the fiber hub out to a rural community. Similarly, a wired network may provide connectivity along a route, but connecting elements situated at a distance from this route would require an extension of this wired network, or the use of complementary techniques. Thus, the reach of a wired network can be extended by the inclusion of wireless networks.

While wireless networks can extend the reach of wired networks, these wireless networks may not be capable of facilitating the same capacity and velocity of data transfer as a wired network. Thus, the hybrid networks of the present technology may allow for the selective transmission of fronthaul data flow across the hybrid network in a manner which is both efficient in coverage and capacity. The hybrid network may selectively separate and reassemble (e.g., via, for example, multiplexing or demultiplexing) fronthaul data flow as needed, based upon key performance indicators or design objectives for each segment of the network. For example, demultiplexing of fronthaul data flow and separate processing of the various components of the flow may allow for high capacity fronthaul data to be transmitted efficiently over a bandwidth-limited wireless network segment by using different transmission methods for the demultiplexed flows.

In accordance with the present technology, RF signals (that may be digitally coded as in-phase and quadrature signals (I/Q)) may be transported within the Mobile Radio Access Network, alongside general information (such as control and management protocol elements) and user data flow (such as user data traffic over local area networks associated with a particular mobile wireless transceiver site and equipment). The RF signals may be transported as analog signals corresponding to the RF carriers modulated as per a corresponding Radio Access Technology (RAT), while general control and management protocol elements and user data flows may be transported as digitally encoded and modulated signals.

These and other advantages of the present technology will be discussed in greater detail herein.

FIG. 1 illustrates an exemplary hybrid network 100 that includes a baseband module 105 associated with a wireline network 110. The wireline network 110 is shown as comprising a fiber ring 115 and a plurality of fiber spurs 120A-F. Additionally, a plurality of wireless networks are communicatively coupled with the fiber spurs 120A-F, as will be described in greater detail relative to FIGS. 2 and 3. It will be understood that the wireline network 110 may comprise any network that utilizes a wired rather than a wireless media. Exemplary wireline networks comprise but are not limited to fiber networks, copper wire networks, coaxial wire networks, and the like.

The hybrid network 100 may also comprise a network management system 125 and a core network 130, which in some instances includes, for example, a core cellular network.

Generally, the hybrid network 100 may be built on a variety of topologies to carry mobile network "fronthaul" signals (for example I/Q quantized samples), control and management protocol elements, and user digital data. Again, the hybrid network 100 may comprise any combination of different media including, but not limited to, fiber optic, electric cables and wireless links—just to name a few. The hybrid network 100 may comprise a transport network spanning one or more network segments that are communicatively coupled to the baseband module 105. The baseband module 105 may be communicatively coupled to any other portion of the hybrid network 100 via fronthaul data flow. It will be understood that the hybrid network 100 may include a limitless number of network segments which are connected to a centralized baseband processing server pool. The hybrid network 100 may support a hierarchical structure for connecting macro sites with stringent key performance indicators ("KPIs", such as transmit power, receiver sensitivity, capacity, availability and range) and high capacity, down to small cell sites with relatively less stringent KPIs since they are designed to serve fewer users over a more geographically limited area.

The present technology provides flexibility for network operators to deploy coverage and capacity where it is needed most (e.g., based upon an RF propagation perspective) by providing both a wireless and a wired interconnection between one or more remote radio transceivers and one or more centrally located baseband modules.

In addition, these exemplary hybrid networks allow for the use of collaborative baseband processes such as joint processing and cooperative reception and transmission that allow for the potential for interference reduction and performance enhancement in a mobile network. Additionally, the hybrid networks allow for a wide range of topological options, including hub and spokes, daisy-chaining, and loops—just to name a few.

Figure 2A:
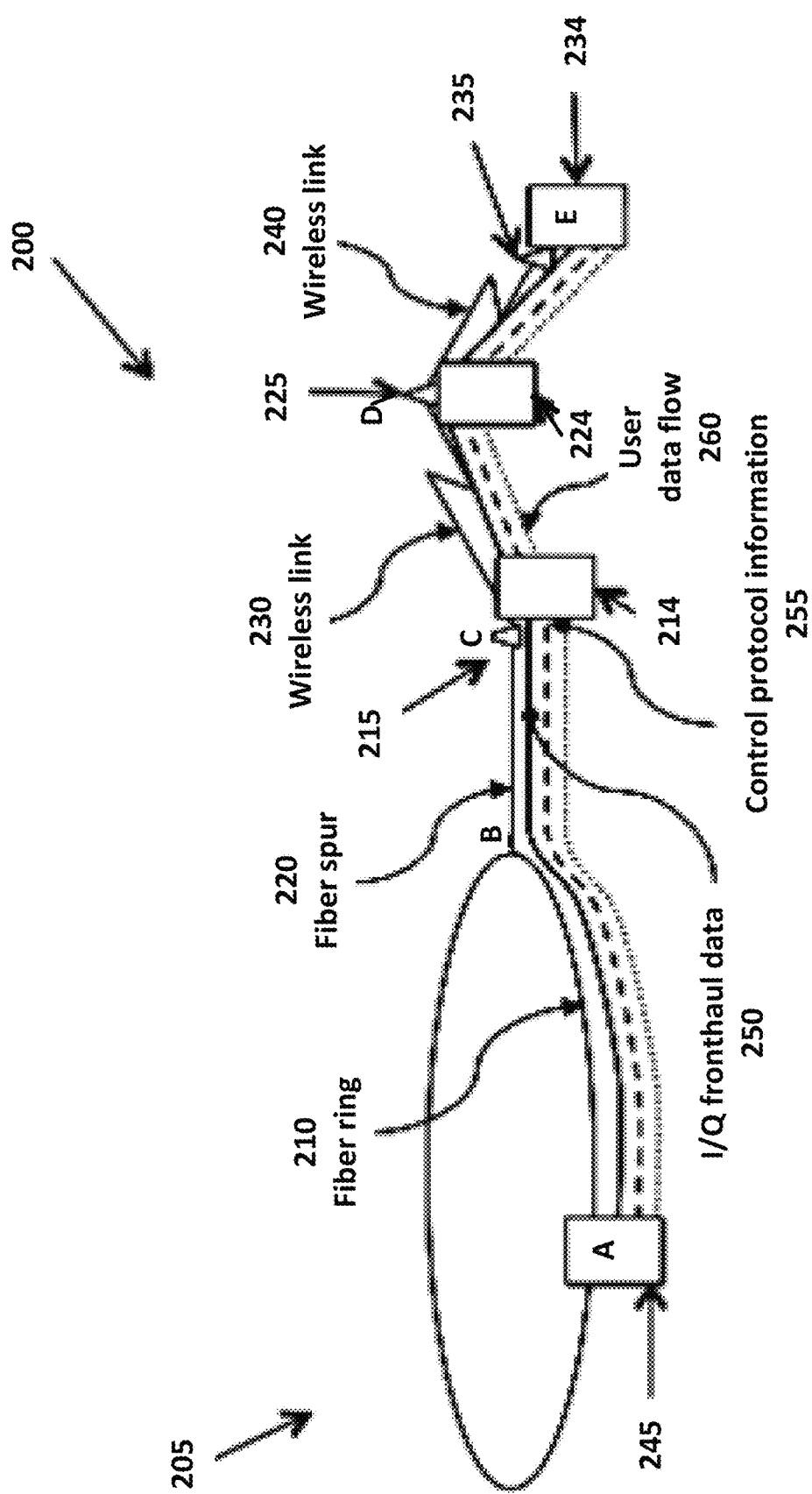
FIG. 2A is an exemplary wide area transport network.

FIG. 2A illustrates a portion of an exemplary wide area transport network 200 that includes a wired network 205 that includes a fiber ring 210 which is communicatively coupled with a first wireless transceiver 215 via a fiber spur 220. Baseband module 245 transmits and receives all the fronthaul signals destined to or transmitted from mobile wireless transceivers 215, 225 and 235. The first wireless transceiver 215 uses the fronthaul signals from baseband module 245 and processed by fronthaul management module 214 and performs all the functions of a standard wireless transceiver. The first fronthaul management module 214 may also be communicatively coupled with a second (or more) fronthaul management module 224, coupled with a mobile wireless transceiver 225, via a first wireless fronthaul network segment 230. Fronthaul management module 214 forwards the portion of the fronthaul signals relevant to the other mobile wireless transceivers such as 225 and 235, to the fronthaul management module 224, in this case via a wireless link. The second wireless fronthaul transceiver 224 may also be communicatively coupled with a wireless fronthaul receiver 234 (e.g., endpoint) via a second wireless fronthaul network segment 240 and a mobile wireless transceiver 235. It will be understood that the mobile wireless transceiver 235 may include, for example, a wireless router or hub although one of ordinary skill in the art will appreciate that the mobile wireless transceiver 235 may comprise any wireless device that is capable of receiving and/or transmitting data over a wired or wireless network with the RF performance as required to handle the characteristics of the signals being transmitted.

It will be understood that the terms "mobile wireless transceiver" may include a network element that transmits and receives RF signals to and from the mobile users. The term "fronthaul module" may refer to a network element responsible for processing the fronthaul signals or data streams. Processing may include tasks such as coding/decoding, modulating/demodulating, multiplexing/demultiplexing, and so forth. In some instances, the mobile wireless transceiver and the fronthaul module may be combined together. Also, while the fronthaul module may be associated with wireless transmission equipment, the fronthaul module may also be associated with a wireline medium, or a mixed wireline/wireless medium. Thus the use of the term fronthaul module to refer to a fronthaul processing and transmission element.

In this embodiment, the network 200 is shown as comprising a baseband module 245 is shown as being associated with the fiber ring 210. The hybrid network 200 is provided to efficiently transmit information from the baseband module 245 to mobile wireless transceivers 215, 225 and 235.

In accordance with the present technology, digital fronthaul data may be separated into constituent parts at the baseband module 245, in a manner that is described in greater detail relative to FIGS. 4-9B. Generally, the digital fronthaul data may be separated into radio signal information 250; control and protocol data 255; and user data 260. Each of the segments of the hybrid network, including both wired segments (e.g., the fiber ring and fiber spur), and the wireless network segments (e.g., first and second wireless network segments 230 and 240) are configured to transmit the separate parts of the digital fronthaul data flow. Thus, the first and second wireless transceivers 215 and 225 pass the separated data. Therefore, there is no need to demultiplex the digital fronthaul data as it travels along the hybrid network 200.

Figure 2B:
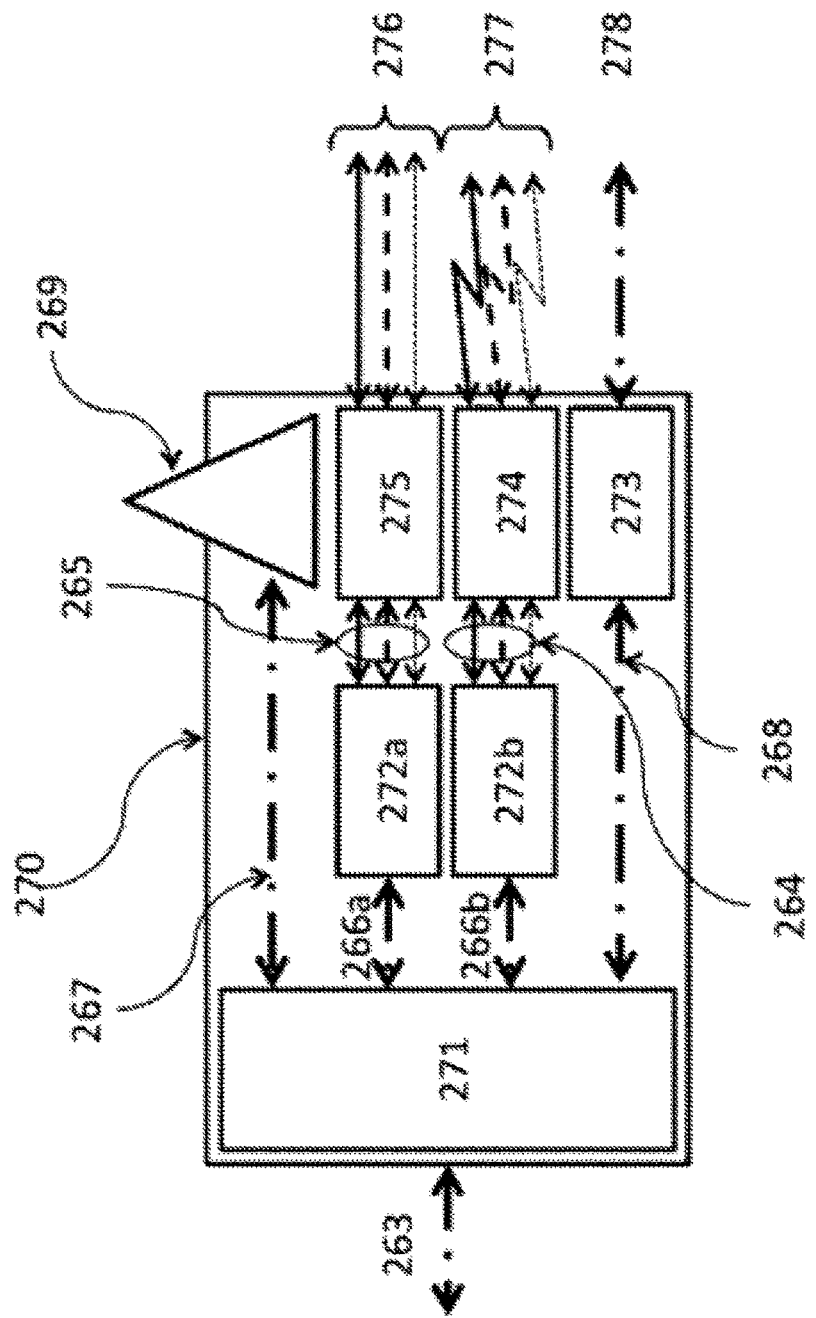
FIG. 2B illustrates an exemplary functional implementation of a fronthaul module according to the present technology.

FIG. 2B illustrates an exemplary functional implementation of a fronthaul module 270 according to the present technology. Fronthaul module 270 presents a digital interface 263 using for example a fiber optic medium. The traffic on fronthaul interface 263 comprises a multiplexed signal that includes several fronthaul signals which are transmitted between a baseband module and a plurality of mobile wireless transceivers, which are communicatively coupled together via the wide area radio access network. An exemplary mobile wireless transceivers is represented as 269. Interface processing module 271 demultiplexes and multiplexes two or more of the fronthaul signals (e.g., fronthaul signals 266a, 266b, 267 and 268) according to a predefined multiplexing algorithm. Fronthaul signals may contain the fronthaul information for the subset of mobile wireless transceivers for which they are destined. Fronthaul signal 266a is fed into processing unit 272a which decomposes fronthaul signal 266a into a RF carriers signal built from the I/Q data contained within fronthaul signal 266a, digitally modulated general control data and digitally modulated user information, both contained in the fronthaul signal 266a, and altogether multiplexed into signal 265. A similar process applies to 266b through 272b and producing signal 264. Fronthaul signal 267 is transmitted into mobile wireless transceiver 269 which may be integrated inside the fronthaul module 270 or communicatively coupled with fronthaul module through an interface.

Multiplexed signal 265 is fed into interface module 275, which may use a wireline medium 276 comprising of any of fiber optic, coaxial cable or copper line. Multiplexed signal 264 may be fed into interface module 274, which may use a wireless medium 277. Interface module 274 can be implemented as a radio transceiver and antenna with the appropriate performance for transmitting multiplexed signal 264 over a certain distance. Fronthaul signal 268 is fed into a digital interface module 273 that may utilize a high capacity wireline medium 278. The signal transiting on this interface consists of the relevant fronthaul information to provide fronthaul signals to mobile wireless transceivers for which they are destined.

While the above represents one direction of the signal flows, all interfaces and modules are designed to process bidirectional signals, such that each operation has its symmetrical function for handling traffic in the other direction.

Figure 3:
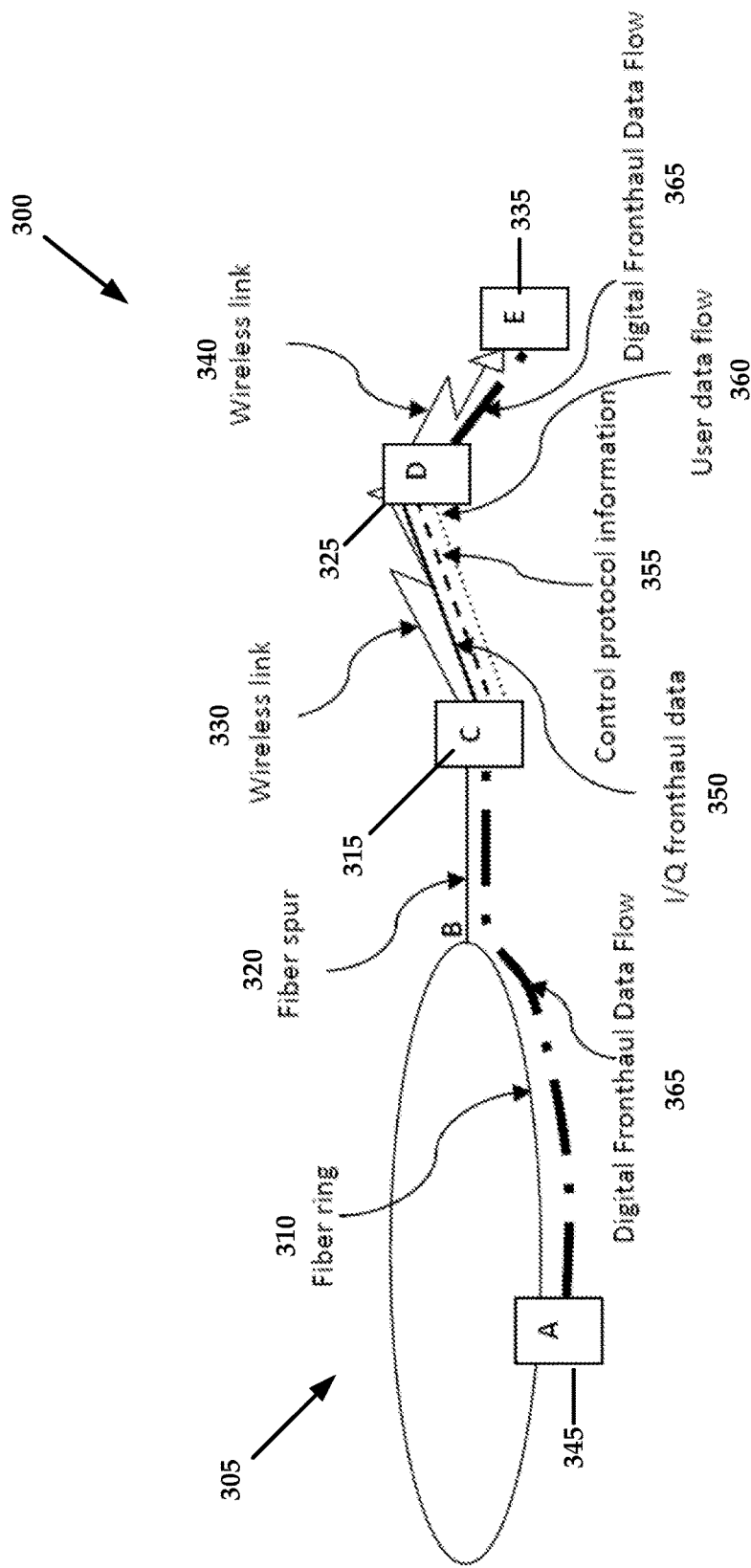
FIG. 3 is another exemplary wide area transport network.

FIG. 3 illustrates a portion of an exemplary wide area transport network 300 that includes a wired network 305 that includes a fiber ring 310 which is communicatively coupled with a first fronthaul module via a fiber spur 320. The first wireless transceiver 315 may also be communicatively coupled with a second (or more) wireless fronthaul transceiver 325 via a first wireless fronthaul network segment 330. The second wireless fronthaul transceiver 325 may also be communicatively coupled with a mobile wireless receiver 335 (e.g., endpoint) via a second wireless network segment 340. It will be understood that the wireless receiver 335 may include, for example, a wireless router or hub although one of ordinary skill in the art will appreciate that the wireless receiver 335 may comprise any wireless device that is capable of receiving and/or transmitting data over a wired or wireless network.

In this embodiment, the network 300 is shown as comprising a baseband module 345 (also referred to as a baseband processor and/or a baseband module processing unit) shown as being associated with the wired network 305. The hybrid network 300 is provided to efficiently transmit information from the baseband module 345 to mobile wireless transceivers 315, 325 and 335.

While the embodiments described above contemplate the use of a fiber ring in combination with one or more fiber spurs, the use of a fronthaul module 270, which is communicatively coupled with the wireline network (e.g., the fiber ring) allows for the elimination of the need to utilize fiber spurs. That is, the fronthaul module 270 may communicatively couple with the wireless transceivers of the wireless network over a wireless communications path.

Figure 2C:
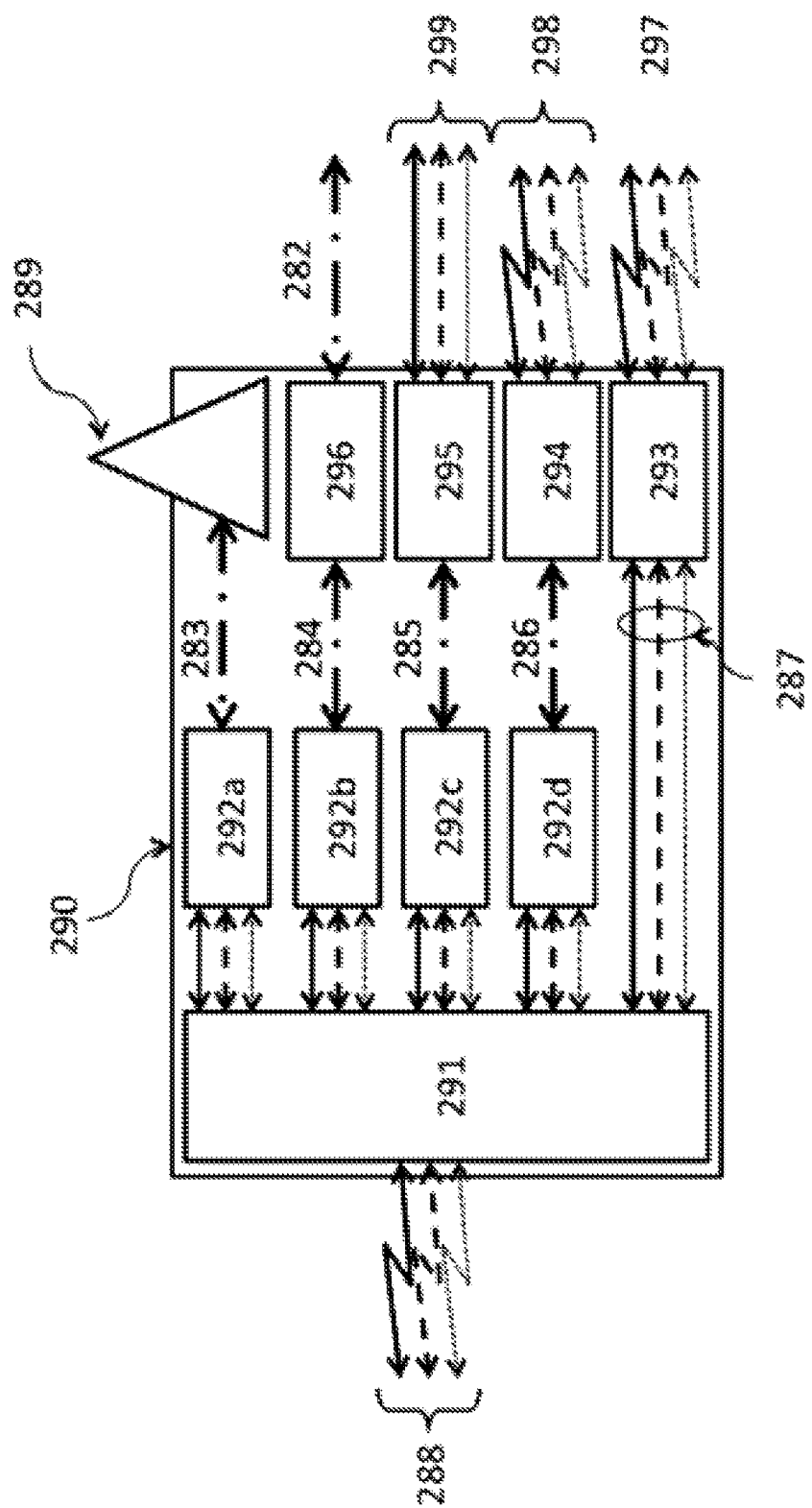
FIG. 2C illustrates another exemplary fronthaul module constructed in accordance with the present technology.

FIG. 2C illustrates another exemplary fronthaul module constructed in accordance with the present technology. In this case fronthaul module 290 uses a wireless interface 288 to receive data received from the baseband module located within the Wide Area Radio Access Network (e.g., wireless network) and to transmit data received from one or more mobile wireless transceivers, to the baseband module. The signals on this wireless interface may comprise a multiplex of modulated RF carriers, digitally modulated general control signals and digitally modulated user information.

Interface module 291 includes a wireless transceiver to process the wireless signals and to demultiplex the aggregated fronthaul signals into individual fronthaul signals which are transmitted fronthaul processing modules 292a, 292b, 292c and 292d, as well as into interface module 293. It is noteworthy that two types of multiplexing may occur: (1) multiplexing several fronthaul signals destined to multiple Remote Radio Units (RRU sometimes referred to as Remote Radio Heads or RRH) (mobile wireless transceivers); and (2) multiplexing the RF carriers with the control information and with the user information for each individual fronthaul signal, as well as to multiplex fronthaul signals from the mobile wireless transceivers which are destined for the baseband module (reverse operation). The purpose of 292a, 292b, 292c and 292d is to transform the digital fronthaul signal into a multiplex of radio carriers, digitally modulated control and digitally modulated user information, resulting in digital fronthaul signals 283, 284 285 and 286, respectively.

In the present example, digital fronthaul signal 283 is transmitted to mobile wireless transceiver 289, which is equipped with a digital wireless fronthaul interface. One example of such interface is given by the Common Public Radio Interface standard or CPRI and the corresponding systems are sometimes referred to as Remote Radio Heads (RRH) or Remote Radio Units (RRU). Conversely digital fronthaul signal 283 is also used to carry uplink signals from the mobile wireless transceiver 289 and destined for the baseband module. In this case, the digital fronthaul signal may only contain the fronthaul signal relevant to mobile wireless transceiver 289.

In the present example, digital fronthaul signal 284 is provided to digital fronthaul interface unit 296 which provides an external digital fronthaul signal 282 used to transmit and receive fronthaul information relevant to the mobile wireless transceivers located in the corresponding part of the network (i.e., "behind" this port). In this case, digital fronthaul signal 282 may contain the fronthaul signal relevant to those mobile wireless transceivers. As an example, digital fronthaul signal 282 may use a fiber medium with a high capacity.

In another example, digital fronthaul signal 285 is transmitted to fronthaul interface unit 295 which provides external interface 299 used to transmit and receive fronthaul information relevant to the mobile wireless transceivers located in the corresponding part of the network (i.e. "behind" this port). In this case fronthaul signal 299 comprises a multiplex of RF carriers, digitally modulated control information and digitally modulated user information carried over a wireline medium. In this case, fronthaul signal 299 may only contain the fronthaul signal relevant to those mobile wireless transceivers. As an example, fronthaul interface 299 may use a fiber medium (or a wavelength of a fiber) or a coaxial cable medium. (In the present example, digital fronthaul signal 286 is used to feed wireless fronthaul interface unit 294 which provides fronthaul signal 298 used to transmit and receive fronthaul information relevant to the mobile wireless transceivers located in the corresponding part of the network (i.e., "behind" this port). In this case fronthaul signal 298 comprises a multiplex of RF carriers, digitally modulated control information and digitally modulated user information carried over a wireless medium. In this case, wireless fronthaul signal 298 may contain the fronthaul signal relevant to those mobile wireless transceivers. As an example, wireless fronthaul interface 299 may comprise an appropriately engineered RF transceiver and antenna.

In the present example, fronthaul signal 287 is a multiplex of RF carriers, digitally modulated control information and digitally modulated user information carried between interface module 291 and wireless interface module 293. Wireless interface module 293 may comprise an appropriately engineered RF transceiver and antenna. In this case, wireless fronthaul signal 287 and wireless fronthaul signal 297 may comprise the fronthaul signal relevant to those mobile wireless transceivers located in the corresponding part of the network. In this case, no conversion to digital fronthaul format is required.

With regards to FIG. 3, and in contrast with the hybrid network 200 of FIG. 2A, the first wireless transceiver 315 is configured to separate a digital fronthaul data received from the baseband module 345 into constituent parts such as radio signal 350, control and protocol information 355, and user data information 360. Conceptually, when an evaluation of key performance indicators for a wireless network segment, such as the first wireless fronthaul network segment 330 indicate that transmission of the digital fronthaul data 365 would be impractical or impossible via the first wireless network segment 330, the first fronthaul management module may separate the digital fronthaul data into the various parts described in greater detail relative to FIGS. 4-9B. For example, if the available bandwidth of the first wireless network segment 330 is less than the size of the digital fronthaul data, the digital fronthaul data may be split and then transmitted over the first wireless network segment 330.

In some instances, the second fronthaul management module 324 may pass the separated information to the fronthaul management module 334 associated with wireless receiver 335. According to some embodiments, the second wireless transceiver 325 may recreate digital fronthaul data 365' from the separate information before transmitting the recreated digital fronthaul data 365' to the wireless receiver 335. Again, methods for recreating the digital fronthaul data from separated information are described in greater detail relative to FIGS. 4-9B. Also, the recreated digital fronthaul data 365' may include different data relative to the original digital fronthaul data 365 because in some embodiments, unneeded data may be removed or modified during separation of the original digital fronthaul data 365.

Figure 4:
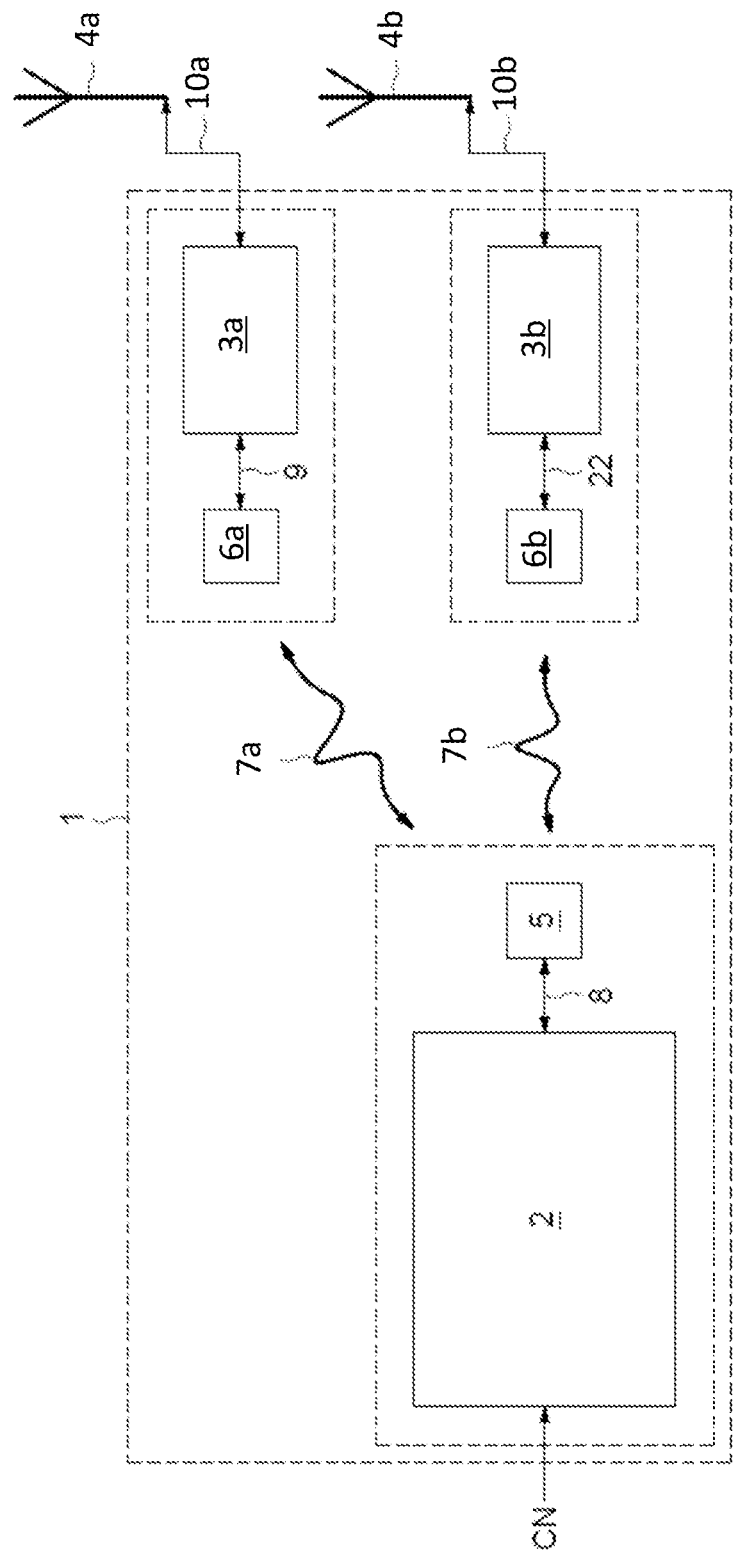
FIG. 4 is a schematic representation of a base station structure implementing the method for transmitting information according to the invention.
Figure 5:
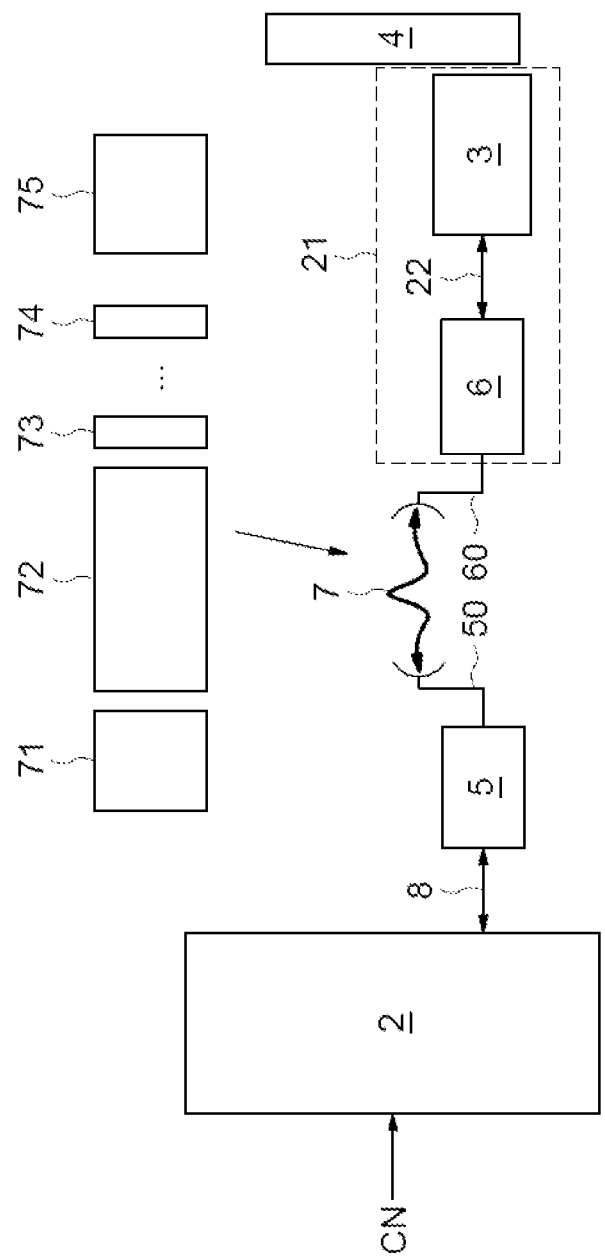
FIG. 5 is a schematic representation of the transmitting of information between two units of the base station of FIG. 4.

FIG. 4 illustrates an exemplary method 400 for transmitting data over a wide area transport network. Again, this network includes a hybrid network that comprises at least one wired network segment and at least one wireless network segment that are communicatively coupled to one another. The hybrid network allows for efficient transmission of data between a transmitter and a receiver, such as a baseband module and a radio frequency unit, respectively.

FIGS. 4-9B collectively illustrate systems and methods for providing for high capacity wireless communications between one or more base band units ("BBU") and one or more radio frequency units ("RFU") within a wireless network assembly, such as a base station ("BS"). The BBU and RFU communicate digitally with one another through a bidirectional transport interface. Signals representing carrier data may be transmitted and received by the antenna(s) associated with the base station (BS) may be sent in the manner known as "I/Q," which stands for "in phase/in quadrature." Other information that does not represent carrier data may also be communicated between the BBU and RFU. These two types of information are typically multiplexed into a digital fronthaul data.

More specifically, the BBU and the RFU may be communicatively coupled using a standardized/approved open protocol, a proprietary protocol, or a combination thereof. In some embodiments, protocols utilized between the BBU and RFU facilitate bidirectional transmission of the digital fronthaul data between the BBU and the RFU either by fiber optics or other wired coupling types. Again, these protocols allow for time-division multiplexing various types of the information such as general information, which may include, but is not limited to control, command, synchronization, and other data, other than "I/Q" information. Radio signals comprising carrier data, also referred to as "traffic data" or "I/Q data," may be transmitted and received by various antenna(s) associated with the Base Station.

These protocols may be entirely digital in nature and their throughput are generally in excess of 600 megabits/s and can exceed 10 gigabits/s. The structure of these protocols typically includes a set amount of words that represent general information and a set amount of words that represent the I/Q data. In some instances the set amount of words representing the general information may be relatively smaller than the set amount of words that represent the I/Q data.

Normally, in order to transport both the I/Q data and the general information, the I/Q data (e.g., radio signal information) is transmitted as a whole in digital form. Digital streams and/or multiplexes may be handled by the system at gradually increasing throughput rates. For example, digital streams on the order of approximately tens of gigabits/s may be transmitted using radio access technologies such as 3G/4G, LTE "Long Term Evolution", LTE-Advanced, and so forth.

Because of its almost limitless capacity, fiber optic media may be utilized to transmit I/Q data. Other solutions contemplate transmitting the digital I/Q and/or general data using wireless networks. One solution contemplates the use of radio waves. This solution requires a substantial throughput rate in order to transport the entire structure (e.g., both I/Q and general data), and thus, substantial bandwidth utilization or sophisticated modulation may be required. These exemplary methods are described in greater detail in European Patent Number 1534027, which is hereby incorporated by reference herein in its entirety including all references cited therein. Another solution contemplates the use of optical waves, as indicated in document U.S. Patent Application Publication Number 2003-027597, which is hereby incorporated by reference herein in its entirety including all references cited therein. While both of these wireless systems propose a digital solution for connecting the BBU module to the RFU radio, these systems suffer from drawbacks which include, but are not limited to the fact that the throughput (e.g., fronthaul) of these systems is quite substantial.

Advantageously, the present technology allows for the transmission of information using wireless systems in such a way that a substantial reduction in the size of the throughput between the BBU and the RFU is achieved while ensuring complete transmission of I/Q data, which is constantly evolving and growing over time. These and other advantages of the present technology will be described in greater detail below with reference to the drawings.

Referring now to FIG. 4, which illustrates an exemplary architecture for practicing aspects of the present technology. A base station (BS) 1 is shown as comprising a baseband module (BBU) 2, which is communicatively coupled with the core network (CN). The CN manages communicative coupling with a public telephony (PSTN) or data network. BBU 2 may be communicatively coupled with a connection unit BBU 5 via any suitable path or channel that allows for the transmission of digital data.

The BS 1 may also comprise a series of radio frequency units, such as radio frequency unit (RFU) 3a and 3b. In this example, two RFUs are present. In one instance, RFU 3a may be communicatively coupled with a RFU coupling module 6a by a communications channel 9 which may allow for analog or mixed analog and digital transmission. In the other instance, RFU 3b may be communicatively coupled to a RFU coupling module 6b by a digital communications channel 22. In an embodiment, RFU 3a may be communicatively coupled to an antenna 4a by a second communication path 10a and RFU 3b may be communicatively coupled to an antenna 4b by a second communication path 10b. The BBU coupling module 5 additionally communicates with all RFU coupling modules 6a and 6b via a wireless communications channel 7a or 7b, also referred to as a "wireless network segment."

FIGS. 4, 5, 7, and 6 collectively illustrate an exemplary system and method for transmitting information using the system of FIG. 4. According to some embodiments, the BBU 2 may be communicatively coupled with the core network (CN) according to methods that would be known to one of ordinary skill in the art with the present disclosure before them.

The BBU 2 communicates with at least one of the RFUs 3 using the BBU coupling module 5, to which the BBU 2 is communicatively coupled via a digital communications channel 8. While the BBU coupling module 5 and BBU 2 have been shown as being separate devices, in some instances the BBU coupling module 5 and the BBU 2 may be integrated into the same device. In some embodiments digital protocol frames 80 may be transmitted between the BBU 2 and an RFU 3 via BBU coupling module 5 using the digital communications channel 8. It is noteworthy that a digital protocol frame 80 may comprise a series of words related to information of two types: (a) words corresponding to general information; and (b) words corresponding to "I/Q" radio signal information. While the method contemplates the use of "words" to differentiate between the two basic types of information included in the digital fronthaul data, the system may be configured to differentiate information types using any other differentiators that may also be used in accordance with the present technology.

Generally, a method for transmitting information may comprise separating digital fronthaul data into the two basic data types, comprising I/Q data and general data. In some instances, separating digital fronthaul data may include demultiplexing of the digital fronthaul data by evaluating digital protocol frames 80.

In another embodiment, a method for transmitting information may comprise separating analog RF signals and the general data, and transmitting them on two different channels.

The digital protocol frames may be evaluated to differentiate words related to general information from the words related to IQ radio signal information in each of the digital protocol frames 80.

Again, data included in the digital protocol frames 80 may be demultiplexed in a demultiplexing module 51 in the BBU coupling module 5. The BBU coupling module 5 may then transmit the demultiplexed information types via the wireless communications channel 7 using an antenna 50. More specifically, the digital protocol frames 80 may be separated into general information and radio frequency information. The general information may be extracted from the protocol frames 80 by the demultiplexing module 51 and passed through as digitally modulated data by digital modulator module 52. The radio frequency information may be further separated into information constituting radio frequency carrier signals 71-74, also referred to as carrier images and modulated accordingly into radio frequency carriers 71-74 by module 53.

Words related to general information may be transmitted through a digital communication channel of the wireless communications channel 7 using digital modulation. With regard to the I/Q radio signals, it should be noted that the I/Q radio signals ultimately represent carriers intended for transmission or reception by the antenna(s) 4 associated with the base station 1. The base station 1 may process the I/Q radio signals with the appropriate technologies required by the radio access interfaces (Radio Access Technology or "RAT"), which allows for communication between mobile devices and the antennas 4 of the BS 1.

Next, the BBU coupling module 5 may be configured to separate the words related to IQ radio signals into a series of radio frequency carriers. The information belonging to I/Q radio signals contained in the digital protocol frame 80 are transmitted as radio frequency carriers 71, 72, 73, 74 by the BBU coupling module 5 through the wireless communications channel 7.

It will be understood that the transmission of I/Q radio signals used by the wireless communications channel 7 may be based on similar radio access technologies implemented by the one or more RFU 3 for the carriers and RAT in question, transmitted and received by the antennas 4 and associated with the RFU 3. For example, the radio technology used to transmit the I/Q radio signals may enhance the efficiency of data transmission over the wireless communications channel 7 relative to various performance characteristics of the wireless medium. These performance characteristics include, but are not limited to line of sight propagation, point-to-point topology, lower interference, and so forth.

The words related to I/Q radio signals are converted into radio frequency carriers 71, 72, 73, 74 using techniques that would be known to one of ordinary skill in the art such as filtering, digital up conversion "DUC", I/Q mixing, mixing, digital/analog conversion, and so forth.

Advantageously, transmitting I/Q radio signals in the form of radio frequency carriers may be transparent at the throughput rates proposed by RATs of operators of the BS 1, as the integrity of the I/Q radio signals, carrier "images", and RATs, transmitted and received by the antennas 4 is sufficiently maintained with regard to the overall performance of the wireless communications channel 7. In some instances, transmitting I/Q radio signals in the form of radio frequency carriers may be accomplished in a non-transparent manner.

Moreover, the bandwidth necessary for the wireless communications channel 7 may be as defined by the associated RAT(s), which are transmitted and received by the antennas 4 associated with the RFU 3.

As an end result, a series of radio frequency carriers 71, 72, 73, 74 for each digital protocol frame 80 may be transmitted through the wireless communications channel 7, and one or more digital modulations may be utilized to transmit the general information protocol elements. The series of radio frequency carriers 71, 72, 73, 74 and the digitally modulated transmissions 75 are then received by the RFU coupling module 6 using an antenna 60.

Next, the RFU coupling unit 6b may perform a method of reassembling the fronthaul signals and data from the previously separated data (e.g., I/Q radio signals and general information). An exemplary method for transmitting information may further comprise converting the series of radio frequency carriers 71, 72, 73, 74 into a series of words representing the I/Q radio signal information. Again, techniques that would be known to one or ordinary skill in the art may be utilized, such as filtering, digital down conversion "DDC", I/Q mixing, mixing, digital/analog conversion and so forth. The digitally modulated transmissions 75 may be used by the RFU 3b according to a pre-established protocol.

More specifically, the method may include conversion by conversion unit 63 of the series of radio frequency carriers 71, 72, 73, 74 into a series of words representing the content of the I/Q radio signals, and demodulation of the digitally modulated data into words representing the general information 61. The series of words may be multiplexed by reassembling the words to recreate digital protocol frames 220, which correspond to the digital protocol frames 80 which were previously demultiplexed. The digital protocol frames 220 are then transmitted to the RFU 3b through second communications channel 22. The second communications channel 22 may allow for the transmission of digital and/or analog data.

In some instances, the carrier images 71-74 may be multiplexed into radio signal information 63, while modulated transmissions 75 is demodulated back into the general information 61. The general information and radio signal information 63 may be reassembled back into digital fronthaul data 62, which is transmitted as digital protocol frames 220.

In order to ensure proper reconstruction of the digital protocol frames 220, synchronization information is transmitted between the BBU coupling module 5 and the RFU coupling module 6b to allow the general information and the I/Q radio signal information of the digital protocol frames 220 to be returned to a coherent form.

The digital protocol generally used to transport frames 80 (after demultiplexing), 220 (after multiplexing) allow for substantial distances between the BBU and the RFU. Therefore those protocols can tolerate a significant proportional delay whether on a wired or a wireless link. For example, for each 10 kilometers of fiber optic used, a delay of 55 microseconds may be seen. Additionally, it is possible to temporarily store the general information or the I/Q information in a buffer zone within the RFU coupling module 6b. This allows for more coherent processing of all (or a substantial portion) of information received based on synchronization information, by the RFU coupling module 6b.

In another exemplary embodiment information not useful to the digital protocol frame 80 is removed in order to eliminate useless information. For example, words that are not filled or used may be eliminated. Thus, only necessary information may be transmitted, proportionally reducing the volume of information transmitted.

Figure 6:
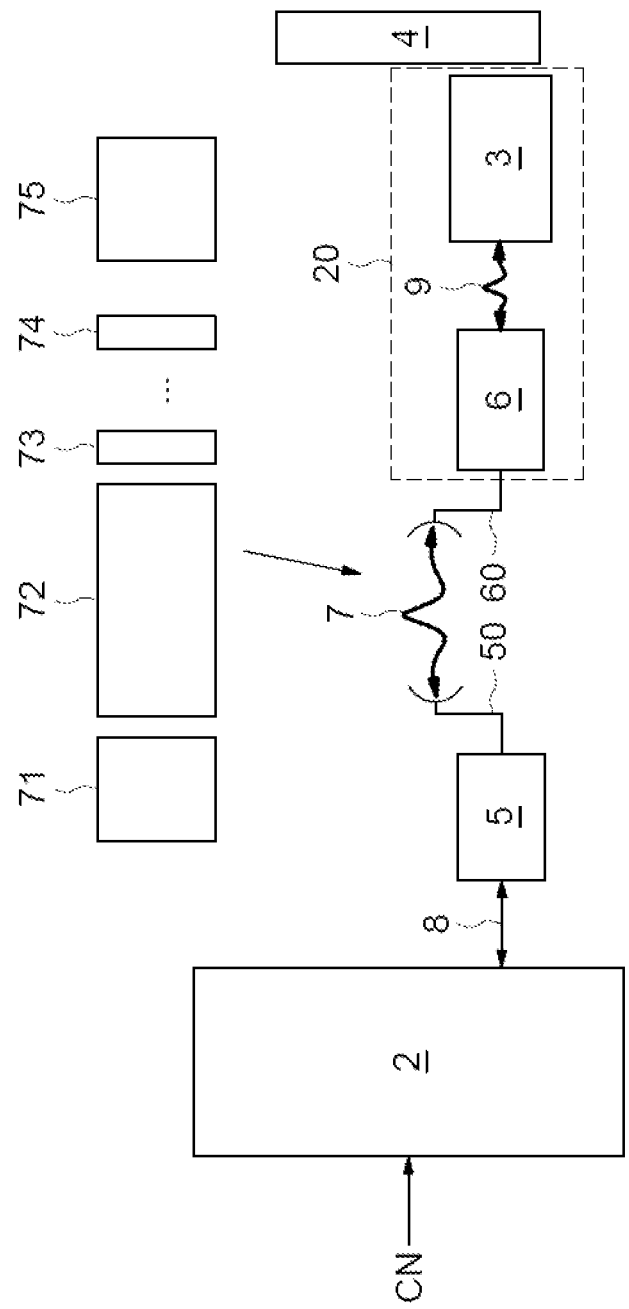
FIG. 6 is a schematic representation of the transmitting of information between two units of the base station of FIG. 4.
Figure 7:
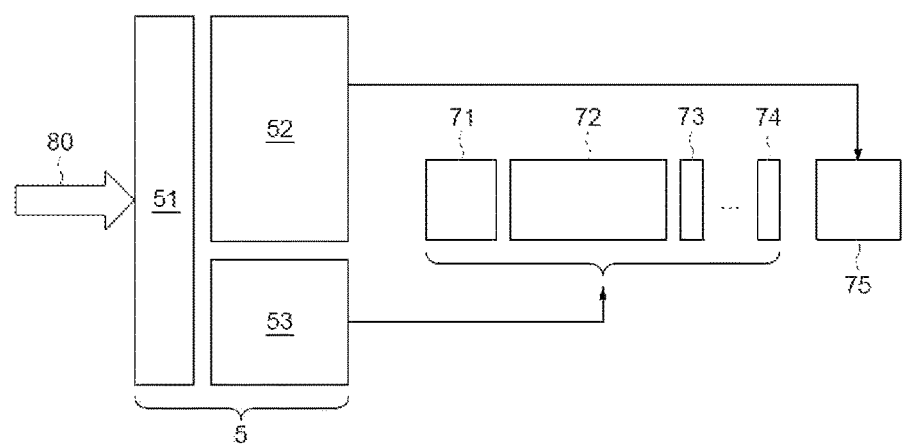
FIG. 7 is a schematic representation of the transmission information according to the present technology at the level of a transmitter.
Figure 8:
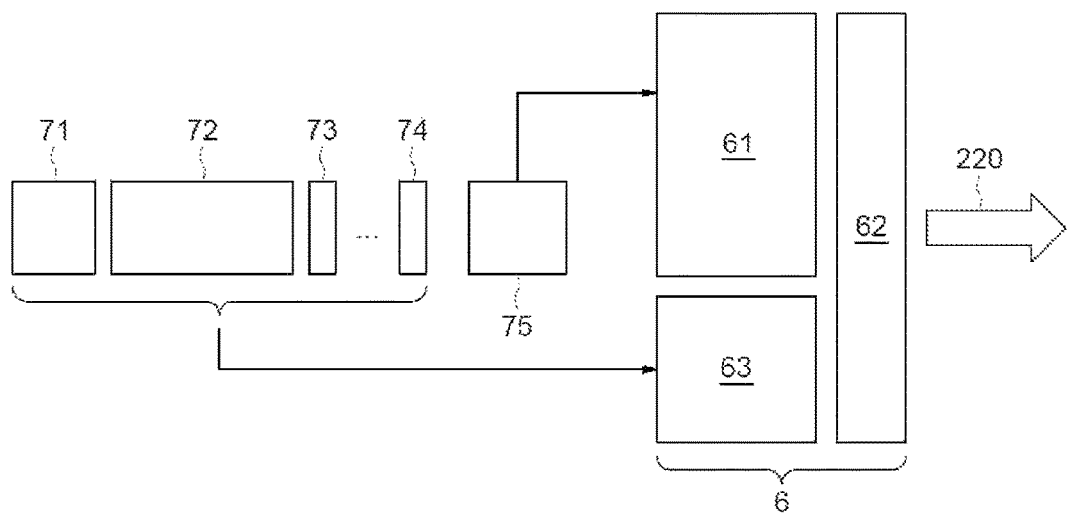
FIG. 8 is a schematic representation of the transmission information according to the present technology at the level of a receiver.

FIG. 6 illustrates another exemplary embodiment where the RFU coupling module 6*a* and the RFU 3*a* form a wireless remote radio head (RRH). According to some embodiments, the RFU coupling module 6*a* retransmits to the RFU the radio frequency carriers 71, 72, 73, 74 via first communications channel 9, for retransmission via the antenna 4*a* associated with the RFU 3*a*. According to some embodiments, the RFU coupling module 6*a* may not multiplex the general information words and in some instances it may not convert the radio frequency carriers 71, 72, 73, 74 into words related to the I/Q radio signal information. Accordingly, the aforementioned digital protocol frames 220 may not be reconstructed by the RFU coupling module 6*b*. Alternatively, the RFU coupling module 6*b* may adapt the radio frequency carriers 71, 72, 73, 74 based on the associated RATs for transmission by the relay antenna 4*b* associated with the RFU 3*b*.

In some instances the general information may be processed by the RFU coupling module 6 (e.g., instead of being transmitted to 3 which then uses it to perform control or management tasks). In some instances, in addition to the first communications channel 9, which may comprise an analog communication link, there may be a separate control interface (such as an API) over which a control and management process can take place.

The term "processing" may be understood to include the modification of RF signals based upon the content control information included in the general information.

According to some embodiments, a BBU coupling module 6*a* may be used to interpret and utilize the general information in order to perform various actions, such as actions performed by the RFU 3*a* with regard to the same type of information. Thus, it may no longer be necessary to transmit complete general information to the RFU 3*a*, which may result in a reduction in the amount of information from the digital protocol frame, leading to more efficient data transmission.

It should be noted that in an exemplary operation, data may be transmitted between the BBU 2, serving as a transmitter, to one of the RFUs 3, serving as a receiver. However, data may likewise be transmitted between one of the RFUs 3, in this case serving as a transmitter, to the BBU 2, which in this case would serve as a receiver.

Advantageously, the present technology may allow for processing of radio frequency carriers in terms of bandwidth (MHz/bandwidth) rather than in terms of throughput rate (Mbit/s) via the wireless communications channel 7. Again, the wireless communications channel 7 may communicatively couple the BBU 2 and the series of RFUs 3 of the BS 1. This configuration allows for a digital solution that benefits from the modulation effectiveness of the technologies implemented on this wireless communications channel 7.

Additionally, spectrum efficiency may be maintained transparently with regards to the Radio Access Technology used on wireless communication channel 7. The present technology can also benefit from the inherent advantages of line of sight/non-line of sight "LoS/NLoS" technologies between fixed stations and single users. Additionally, this method allows the use of different frequency bands to transmit different signals according to the methods described in European Patent Number 1895681, which is hereby incorporated by reference herein in its entirety including all references cited therein.

In some instances the present technology advantageously accommodates complementary diversity technologies to increase efficiency such as multi-polarization, line-of-sight multiple-input multiple-output "LoS MIMO," and so forth.

With methods and systems for transmitting information described above relate to the field of mobile telephony, the present technology may be applicable to many types of radio networks such as public mobile radio networks "PMR" used by law enforcement and first responders, as well as in any radio system that includes radio stations and antennas or active antennas and/or radar—just to name a few.

Figure 9A:
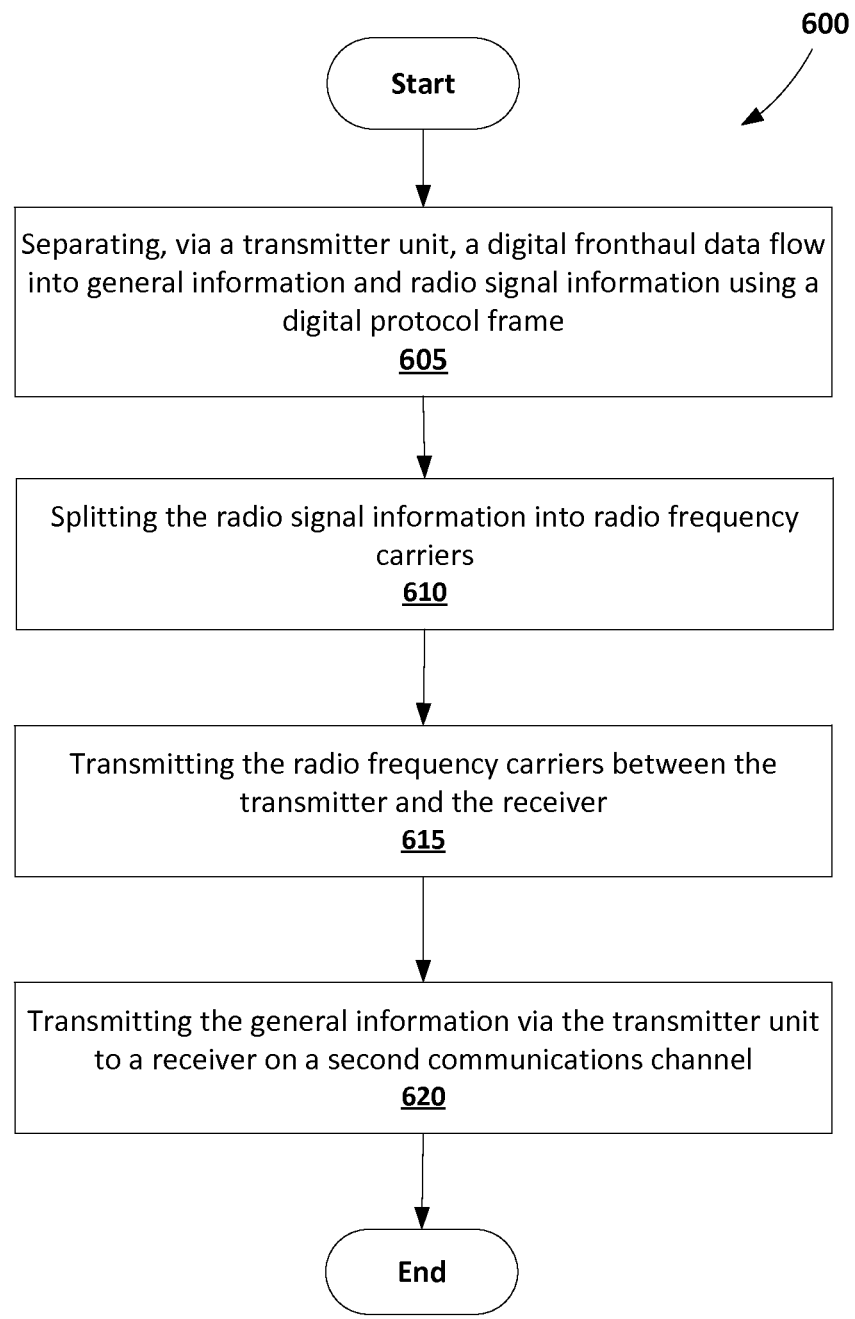
FIGS. 9A and 9B are flowcharts of an exemplary method for transmitting information.

FIG. 9A is a flowchart of an exemplary method 600 for transmitting information via a wireless communications channel. According to some embodiments, the method 600 may comprise a step 605 of separating, via a transmitter unit, a digital fronthaul data flow into general information and radio signal information using a digital protocol frame. According to some embodiments, the step 605 of separating may include demultiplexing of the general information and the radio signal information from the digital fronthaul data.

In some instances, in the step 605 of separating, information not belonging to the digital protocol frame may be removed to reduce the amount of unneeded data that is transmitted over the wireless network segment. This feature may reduce the latency of the wireless network segment, while also reserving network bandwidth for greater consumption and transmission of radio signal information and/or general information.

Additionally, the method 600 may comprise a step 610 of splitting the radio signal information into radio frequency carriers as well as a step 615 of transmitting the radio frequency carriers between the transmitter and the receiver. The transmission of the radio signal information and/or carrier is carried out using appropriate radio access interface technologies. Moreover, step 620 may include a step of transmitting the general information via the transmitter unit to a receiver on a second communications channel. In some instances, the transmitter and the receiver may be communicatively coupled with one another using a digital communications channel. In some instances, the general information may be transmitted over the wireless network segment by digital modulation of the general information.

Figure 9B:
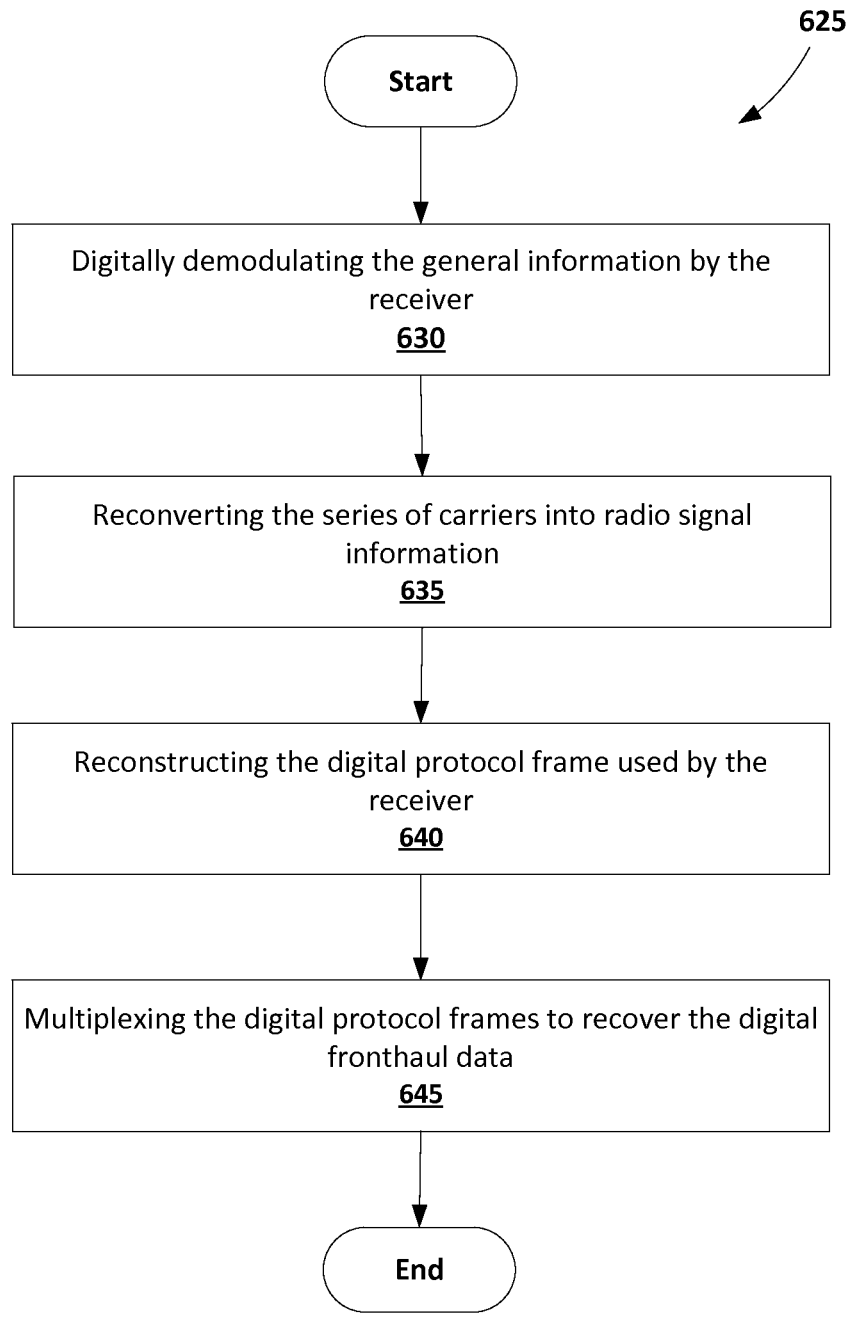

FIG. 9B is a flowchart of an exemplary method 625 for transmitting information. It is noteworthy that the method described with regard to FIG. 9A specifies the separating of digital fronthaul data into constituent parts to enhance the transmission of the constituent parts over a wireless network segment. The method 625 of FIG. 9B contemplates the reassembling of the separated parts transmitted over the wireless network segment in such a way that the digital fronthaul data is recreated.

The method 625 may include a step 630 of digitally demodulating the general information as it is received by the receiver (or prior to receipt of the general information). Similarly, the method 625 may include a step 635 of reconverting the series of carriers into radio signal information. Again, the radio signal information is a digital signal. By extension, the step 635 allows for a step 640 of reconstructing the digital protocol frames used by the receiver. After reconstructing the digital protocol frames, the method may include a step 645 of multiplexing the digital protocol frames to recover the digital fronthaul data. It is noteworthy that the recovered digital fronthaul data may include less data than the original digital fronthaul data if unneeded data was removed during a subsequent step of evaluating the digital protocol frames.

Although not shown, exemplary methods may also include steps such as transmitting information for synchronizing the general information and the radio signal information as well as buffering of both the general information and the radio frequency information before synchronizing the general information and the radio signal information. This synchronization may depend, in part, on the synchronization information used. Synchronization may be utilized for timing recovery, location determination using methods such as Time Difference of Arrival, and various mobile wireless functions such as diversity, Multiple Input Multiple Output, coordinated or joint transmission, and time division multiplexing. For example, transmission of the general information and the radio frequency information through the wireless network having unstable synchronization may result in a degradation or failure of the mobile wireless performance. This problem is propounded when several fronthaul links are chained or juxtaposed. Thus, proper and stable synchronization of the various nodes in the transport network is necessary to ensure a proper quality and performance. It is noteworthy that transmission steps may be carried out on different frequency bands. Additionally, in some embodiments the transmitter may include a baseband module and the receiver may include at least one radio frequency unit, or vice versa.

Other exemplary methods may include the step of processing the general information in the BBU coupling module 5 prior transmitting it. The term "processing" may be understood to include the modification of RF signals based upon the content control information included in the general information.

According to some embodiments, obtaining precise and stable synchronization may be realized by using global positioning system (GPS) data obtained from receivers communicatively coupled with certain fronthaul management modules within the network. Since a high precision of the synchronization information may not be required in all nodes of the network, using additional synchronization sources such as GPS can be used in those nodes where such precision may be required. By using this external synchronization source, the fronthaul modules are able to ensure that the synchronization information stays precise over any period of time. While the use of GPS data has been described, one of ordinary skill in the art would appreciate that other synchronization data may likewise be utilized in accordance with the present technology.

As mentioned previously, while the above-described methods for transmitting information have been described in relation to a base station (BS) of a mobile telephone communications system, the methods for transmitting information are applicable in any suitable field that would be known to one of ordinary skill in the art with the present disclosure before them.

Figure 10:
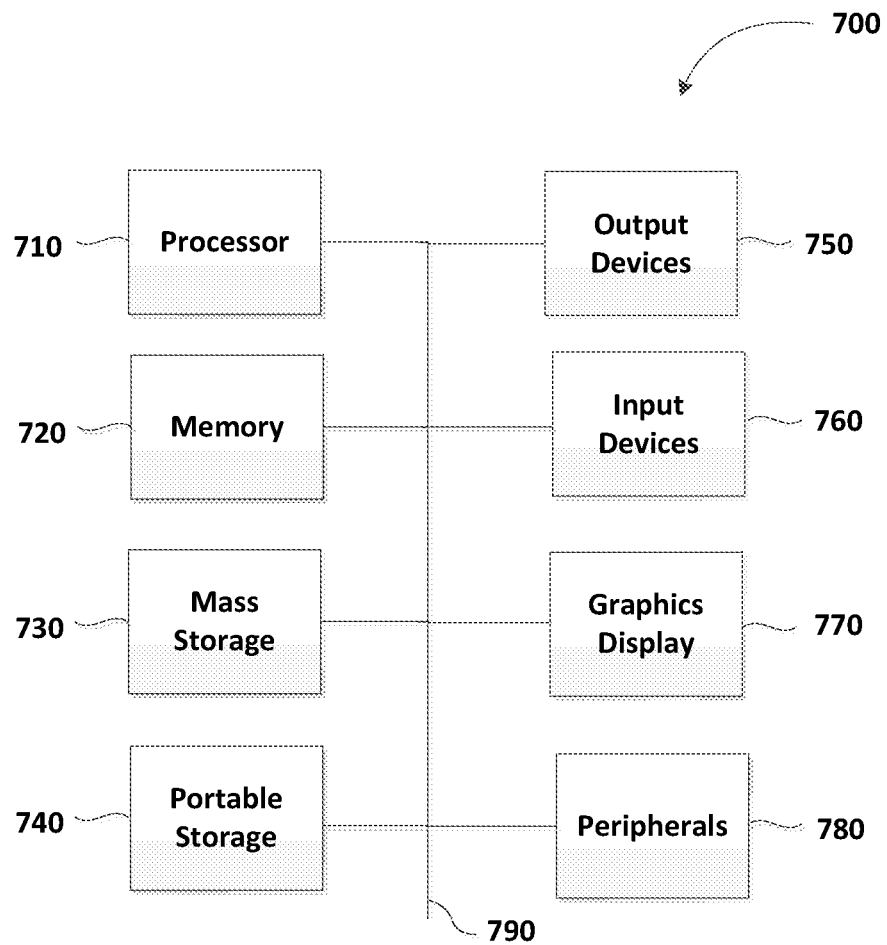
FIG. 10 illustrates an exemplary computing system that may be used to implement embodiments according to the present technology.

FIG. 10 illustrates an exemplary computing system 700 that may be used to implement an embodiment of the present technology. The computing system 700 of FIG. 10 includes one or more processors 710 and memory 720. Main memory 720 stores, in part, instructions and data for execution by processor 710. Main memory 720 can store the executable code when the system 700 is in operation. The system 700 of FIG. 10 may further include a mass storage device 730, portable storage medium drive(s) 740, output devices 750, user input devices 760, a graphics display 770, and other peripheral devices 780. The system 700 may also comprise network storage 745.

The components shown in FIG. 10 are depicted as being connected via a single bus 790. The components may be connected through one or more data transport means. Processor unit 710 and main memory 720 may be connected via a local microprocessor bus, and the mass storage device 730, peripheral device(s) 780, portable storage device 740, and graphics display 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present technology for purposes of loading that software into main memory 720.

Portable storage device 740 operates in conjunction with a portable non-volatile storage medium, such as a floppy disk, compact disk or digital video disc, to input and output data and code to and from the computing system 700 of FIG. 10. The system software for implementing embodiments of the present technology may be stored on such a portable medium and input to the computing system 700 via the portable storage device 740.

Input devices 760 provide a portion of a user interface. Input devices 760 may include an alphanumeric keypad, such as a keyboard, for inputting alphanumeric and other information, or a pointing device, such as a mouse, a trackball, stylus, or cursor direction keys. Additionally, the system 700 as shown in FIG. 10 includes output devices 750. Suitable output devices include speakers, printers, network interfaces, and monitors.

Graphics display 770 may include a liquid crystal display (LCD) or other suitable display device. Graphics display 770 receives textual and graphical information, and processes the information for output to the display device.

Peripherals 780 may include any type of computer support device to add additional functionality to the computing system. Peripheral device(s) 780 may include a modem or a router.

The components contained in the computing system 700 of FIG. 10 are those typically found in computing systems that may be suitable for use with embodiments of the present technology and are intended to represent a broad category of such computer components that are well known in the art. Thus, the computing system 700 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A network device of a wide area transport network, the network device comprising:
   a first network interface that is digital and coupled to a wired network;
   a second network interface coupled to a wireless network;
   a fronthaul module that is configured to:
      receive a multiplexed fronthaul data flow; and
      separate the multiplexed fronthaul data flow into a plurality of signals comprising radio signal information, control protocol information, and user data flow to allow for transmission of the radio signal information as Radio Frequency ("RF") carrier signals to allow for transmission of the control protocol information and the user data flow using digital communication methods; and
   a transceiver that is configured to:
      transmit the RF carrier signals of the separated multiplexed fronthaul data flow to a wireless transceiver of the wireless network on the second network interface; and
      transmit another portion of the separated multiplexed fronthaul data flow to the wired network on the first network interface.

2. The network device according to claim 1, wherein the multiplexed fronthaul data flow comprises the radio signal information, the control protocol information, and the user data flow, and wherein passing of the multiplexed fronthaul data flow comprises separating the multiplexed fronthaul data into the control protocol information, the user data flow, and the radio signal information, and transmitting the radio signal information as RF carriers signals, and transmitting the control protocol information and the user data flow as digital data.

3. The network device according to claim 1, wherein the plurality of signals comprises any of (a) the radio signal information transmitted as Radio Frequency carrier signals, (b) the control protocol information, (c) the user data flow, and (d) a digital fronthaul data flow which comprises a multiplex of digitized samples of (a), (b), and (c), and any combination of the digitized samples of (a), (b), and (c).

4. The network device according to claim 1, wherein the network device is coupled with at least one baseband module that is communicatively coupled with the wired network and the wireless transceiver is communicatively coupled with the wireless network.

5. The network device according to claim 1, wherein the fronthaul module is communicatively coupled to the wireless transceiver and multiplexes the radio signal information, the control protocol information from the wireless transceiver, and the user data flow into a digital fronthaul data flow for output to a baseband module or another wireless transceiver.

6. The network device according to claim 1, wherein the wide area transport network comprises one or more public network segments having resources dedicated to transporting the multiplexed fronthaul data flow.

7. The network device according to claim 1, wherein the network device outputs the radio signal information coded as Radio Frequency carrier signals, the control protocol information, and the user data flow, and the wireless transceiver receives the radio signal information, the control protocol information, and the user data flow.

8. The network device according to claim 7, wherein the network device outputs the plurality of signals as an analog radio frequency carrier signal and one or more fronthaul modules transmit the analog radio frequency carrier signal to one or more wireless transceivers without reconverting and remultiplexing the analog radio frequency carrier signal into a digital fronthaul flow.

9. The network device according to claim 1, wherein the wired network comprises a fiber hub that is communicatively coupled to a plurality of wireless transceivers via the network device.

10. The network device according to claim 1, wherein the network device further utilizes synchronization to increase synchronization precision between the control protocol information and the RF carrier signals processed by the network device.

* * * * *